United States Patent [19]
Huang et al.

[11] Patent Number: 6,122,713
[45] Date of Patent: Sep. 19, 2000

[54] DUAL PORT SHARED MEMORY SYSTEM INCLUDING SEMAPHORES FOR HIGH PRIORITY AND LOW PRIORITY REQUESTORS

[75] Inventors: Xiaoce Huang; Rodney Cummings, both of Austin, Tex.; Yan Wu, Ocean, N.J.

[73] Assignee: National Instruments Corporation, Austin, Tex.

[21] Appl. No.: 09/088,542

[22] Filed: Jun. 1, 1998

[51] Int. Cl.[7] ................................................. G06F 13/00
[52] U.S. Cl. ..................... 711/147; 711/148; 711/149; 711/150; 711/151; 711/152
[58] Field of Search ................... 395/3, 200, 43, 395/683; 709/300; 711/100, 147, 148, 149, 150, 151, 152, 158, 163

[56] References Cited

U.S. PATENT DOCUMENTS

| | | | |
|---|---|---|---|
| 4,964,040 | 10/1990 | Wilcox ........................................ | 710/3 |
| 5,434,975 | 7/1995 | Allen ....................................... | 709/300 |
| 5,623,670 | 4/1997 | Bohannon et al. ...................... | 710/200 |
| 5,842,015 | 11/1998 | Cunniff et al. .......................... | 709/104 |
| 5,872,980 | 2/1999 | Derrick et al. .......................... | 395/726 |

OTHER PUBLICATIONS

"5136–DN DeviceNet Scanner Module," Reference Guide, Version 2.1, S–S Technologies Inc., Jan. 24, 1997, 62 pages.
"Synchronizing shared objects", Kiser, M.; Zogg, A. Applications of Object–Oriented Programming, IEE Colloquium on, 1989, Page(s):4/1–4/5.

*Primary Examiner*—Do Hyun Yoo
*Assistant Examiner*—Than Nguyen
*Attorney, Agent, or Firm*—Conley, Rose & Tayon P.C.; Jeffrey C. Hood

[57] ABSTRACT

A system and method for controlling access to a dual port shared memory in a system comprising a host computer system and a communication device comprised in or coupled to the host computer system. The communication device includes the shared memory and also includes a local processor which executes a communication application. The shared memory is accessible by both the host computer and the local processor on the communication device. The board or local processor has deterministic and/or real time requirements and is thus the high priority requester, while the host CPU or host computer is the low priority requester. If the high priority side (board) gains the semaphore first, then accesses by the low priority side (host computer) are blocked until the write is finished. In the case of a host read/board write, if the low priority side gains the semaphore first, then the high priority side write can pre-empt the low priority side read. In this case, to avoid data integrity issues, the low priority side is required to verify that it still owns the semaphore after it finishes its read access, and the access fails if the low priority side does not own the semaphore at the time the read is completed. In the case of a host write/board read, if the low priority side gains the semaphore first, then the high priority side does not simply pre-empt to the low priority side as in the high to low data transfer direction. Rather, in this instance, when the high priority side determines that the low priority side owns the semaphore, the high priority side reads previously read data from a local buffer.

20 Claims, 13 Drawing Sheets

Host Write
(Low Priority Write)

DeviceNet Software Architecture

Input: Firmware (FW) on the plug-in card writes data to the shared memory while host PC reads it.

Semaphore that controls the shared memory access: FwInputSem
HostInputSem

Signal used by firmware that indicates a new update to host PC: UpdateInput

Plug-in card write:

Host PC read:

Output: Firmware (FW) on the plug-in card reads data from the shared memory while the host PC writes it.

Semaphore that controls the shared memory access: FwOutputSem
HostInputSem

Signal used by host that indicates a new update to Firmware: UpdateOutput

Plug-in card read:

Host PC write:

DUAL PORT SHARED MEMORY SYSTEM INCLUDING SEMAPHORES FOR HIGH PRIORITY AND LOW PRIORITY REQUESTORS

FIELD OF THE INVENTION

The present invention relates to computer-based systems including communication devices, such as add-in communication boards, and more particularly to a communication board or device which includes a shared memory system having semaphores for high priority and low priority requestors.

DESCRIPTION OF THE RELATED ART

Many systems include a computer system which includes an interface card or communication device which couples to an external device or system. For example, modern computer systems generally include an expansion bus which is adapted to receive add-in cards for communication with external devices or systems. For example, a network computer system typically includes a network interface card which communicates between the host computer and the network to which the computer is connected. In the field of instrumentation and industrial automation, a computer system generally includes an interface card for coupling to various types of buses including the GPIB (general purpose interface bus) the VXI bus, a data acquisition card for interfacing to external sensors or a unit under test, or an interface card for coupling to the various types of industrial automation networks, including Foundation fieldbus, CAN, CANopen, and DeviceNet among others.

In each of these systems, a mechanism is needed to enable the host computer to communicate data, i.e., send/receive data to/from the external system. Often times, the interface card or communication device includes a shared memory which is used both by the host CPU comprised in the computer system and a local CPU or processing device executing on the interface card. The shared memory allows the host CPU and the local or embedded CPU to communicate data and commands. Due to the fact that the shared memory region can be accessed from both sides, i.e., both by the host CPU and the embedded CPU, race conditions and/or conflicts can occur when each device simultaneously attempts to either read or write data into memory. In order to prevent these conflicts, one or more semaphores are conventionally used which indicate ownership or access rights to the shared memory. However, some communication devices and/or interface cards have real time requirements, i.e., execute a real time or operating system and are required to execute instructions in a real time or deterministic manner. In these instances, it is undesirable for the real time application to be stalled because of inability to access the shared memory. Therefore, an improved system and method is desired for enabling dual port access to a shared memory system by high priority and low priority requesters.

Background on industrial automation networks is deemed appropriate. An industrial automation network is a specific type of local area network (LAN) that is used to monitor or control one or more pieces of production equipment. An industrial automation network comprises a plurality of digital devices and control/monitoring equipment that are integrated to provide I/O and control for automated processes. An industrial automation network is typically used in industrial and/or process control applications, such as a factory or a manufacturing plant. Example of industrial automation networks are the Controller Area Network (CAN) and DeviceNet, which is based on CAN. Other examples of industrial automation networks are fieldbus networks, such as the Foundation Fieldbus network.

The Controller Area Network (CAN) is growing in popularity as a device-level network. CAN was originally developed to address the needs of in-vehicle automotive communications. Automobiles include a variety of control devices, for such functions as engine timing, carburetor throttle control, and antilock brake systems. With increasing demands placed upon these systems for safety, performance, and customer needs, CAN was developed to provide a digital serial bus system to connect controllers. CAN has been standardized internationally (ISO DIS 11898 and ISO DIS 11519-2) and is currently available in a number of silicon implementations. The CAN protocol meets real-time requirements encountered in many automotive applications. The network protocol can detect and correct transmission errors caused by electromagnetic interference. Also, the network itself is relatively easy to configure and offers the ability to perform centralized diagnostics.

Comparison of automotive and industrial network requirements show that a number of characteristics of CAN also make it suitable for industrial applications. These characteristics include low cost, suitability for harsh electrical environments, good real-time capabilities, and ease of configuration. There are now many examples of CAN being the basis for networks used in industrial manufacturing applications. CAN is particularly well-suited to networking smart I/O devices, as well as sensors and actuators, either in a single machine or in a plant. Several industrial device bus systems have been built upon CAN. Allen-Bradley developed DeviceNet, a CAN-based protocol now maintained by the Open DeviceNet Vendor's Association. Other such industrial networks include CANopen, developed by CAN in Automation (CiA) and the Smart Distributed System (SDS), developed by Honeywell Microswitch.

SUMMARY OF THE INVENTION

The present invention comprises a system and method for controlling access to a dual port shared memory in a system. The system comprises a host computer system and a communication device comprised in or coupled to the host computer system, wherein the communication device interfaces to an external system. The communication device includes the shared memory and also includes a local processor which executes a communication application. In the preferred embodiment, the communication device is a DeviceNet interface card.

In the preferred embodiment, the board or local processor has deterministic and/or real time requirements, and the host computer system is non-deterministic due to the nature of its operating system. The board or local processor is thus preferably the high priority requester, and the host CPU or host computer is the low priority requestor. Since the low priority side access may be pre-empted if necessary by the high priority side, the system and method operates to maintain data integrity in the shared memory. There are two different shared memory access situations that may arise, these being the low priority side reading while the high priority side is writing, and the low priority side writing while the high priority side is reading. The shared memory access scheme of the present invention operates to eliminate non-deterministic waits by the firmware or local processor.

When the host computer system desires to perform a read operation, the host computer system first examines a semaphore to determine if the shared memory is available, i.e., if the local processor is currently writing the shared memory. If the shared memory is determined to not be available, then in the preferred embodiment the host computer system is blocked from accessing the shared memory, and is required to wait until the shared memory is available. In an alternative embodiment, the host computer system reads from a local buffer if the shared memory is not available.

If the shared memory is determined to be available, then the host computer system reads the shared memory. After the read, the host computer system determines if the local processor has written the shared memory during the host reading operation, preferably by examining status information. If the local processor has not written the shared memory during the host reading operation, the host computer system releases the semaphore, indicating completion of the read. If the local processor has written the shared memory during the host reading operation, the host reading operation fails, and will often be attempted again.

The local processor preferably has unlimited write access to the shared memory, and the local processor on the communication device is operable to perform a write operation to the shared memory while the host computer system is reading the shared memory. In this instance, when the local processor on the communication device performs a write operation to the shared memory, the local processor manipulates the status information to inform the host computer that the local processor is writing to the shared memory.

When the local processor desires to perform a read operation, the local processor manipulates a semaphore to acquire the shared memory for a read operation. The local processor then determines if the host computer system is currently writing to the shared memory, preferably by examining status information. If the host computer system is currently writing to the shared memory, then the local processor reads data from a local buffer to obtain previously read data. If the host computer system is not currently writing to the shared memory, then the local processor reads the shared memory. During the read of the shared memory, the local processor operates to store read data in the local buffer. The local processor then manipulates the semaphore to indicate completion of the read operation after either reading from the local buffer or reading from the shared memory.

When the host computer system desires to perform a write to the shared memory, the host computer system first examines the semaphore to determine if the local processor is currently reading the shared memory. If the local processor is currently reading the shared memory, then the host computer system is blocked from accessing the shared memory, and is required to wait until the shared memory is available. If the local processor is not currently reading the shared memory, then the host computer system manipulates status information to indicate that the host computer system is writing to the shared memory, and then performs the write operation to the shared memory. Upon completion of the write, the host computer system manipulates the status information to indicate completion of the write.

BRIEF DESCRIPTION OF THE DRAWINGS

A better understanding of the present invention can be obtained when the following detailed description of the preferred embodiment is considered in conjunction with the following drawings, in which.

Figure 1:
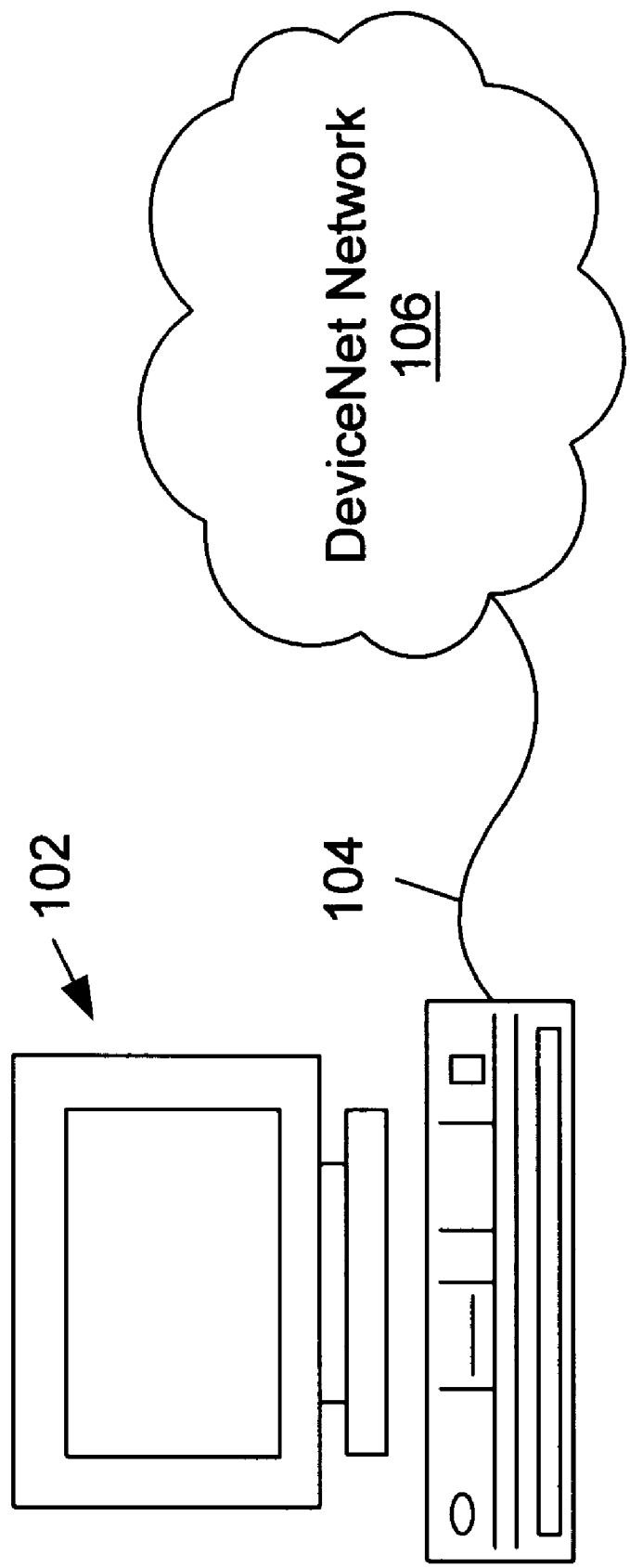
FIG. 1 illustrates a system which includes a shared memory architecture according to the present invention.

While the invention is susceptible to various modifications an alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

FIG. 1—Computer System

FIG. 1 is an embodiment of a system which includes the shared memory architecture of the present invention. As shown, the system includes a computer system 102. The computer system 102 includes a communication device or board, wherein the communication device or board includes a processing unit for implementing a communications function. The communication device or board also includes a shared memory which is useable by both the host CPU executing on the computer system and the processing unit comprised on the communication device.

The communication device comprised in the computer 102 couples through cable 104 to a communication system. In the preferred embodiment, the communication board is a CAN bus or DeviceNet interface communications device, and the communications device couples to, e.g., a DeviceNet network 106.

Although the preferred embodiment is described below with respect to a DeviceNet network 106, it is noted that the shared memory architecture of the present invention may be used for communicating with any of various types of communication systems or external devices. Thus the shared memory architecture of the present invention may be used for communicating with any of various types of fieldbuses or industrial automation buses, e.g., DeviceNet, CAN, Foundation Fieldbus, Profibus, FIP, etc., any of various types of instrumentation buses, e.g., GPIB, VXI, PCI, CompactPCI, PXI, serial, data acquisition, etc., any of various types of networks, e.g., Ethernet, Token Ring, ATM, etc., and any of various types of other systems, including multimedia devices such as video devices, audio devices, graphics devices, etc.

Figure 2:
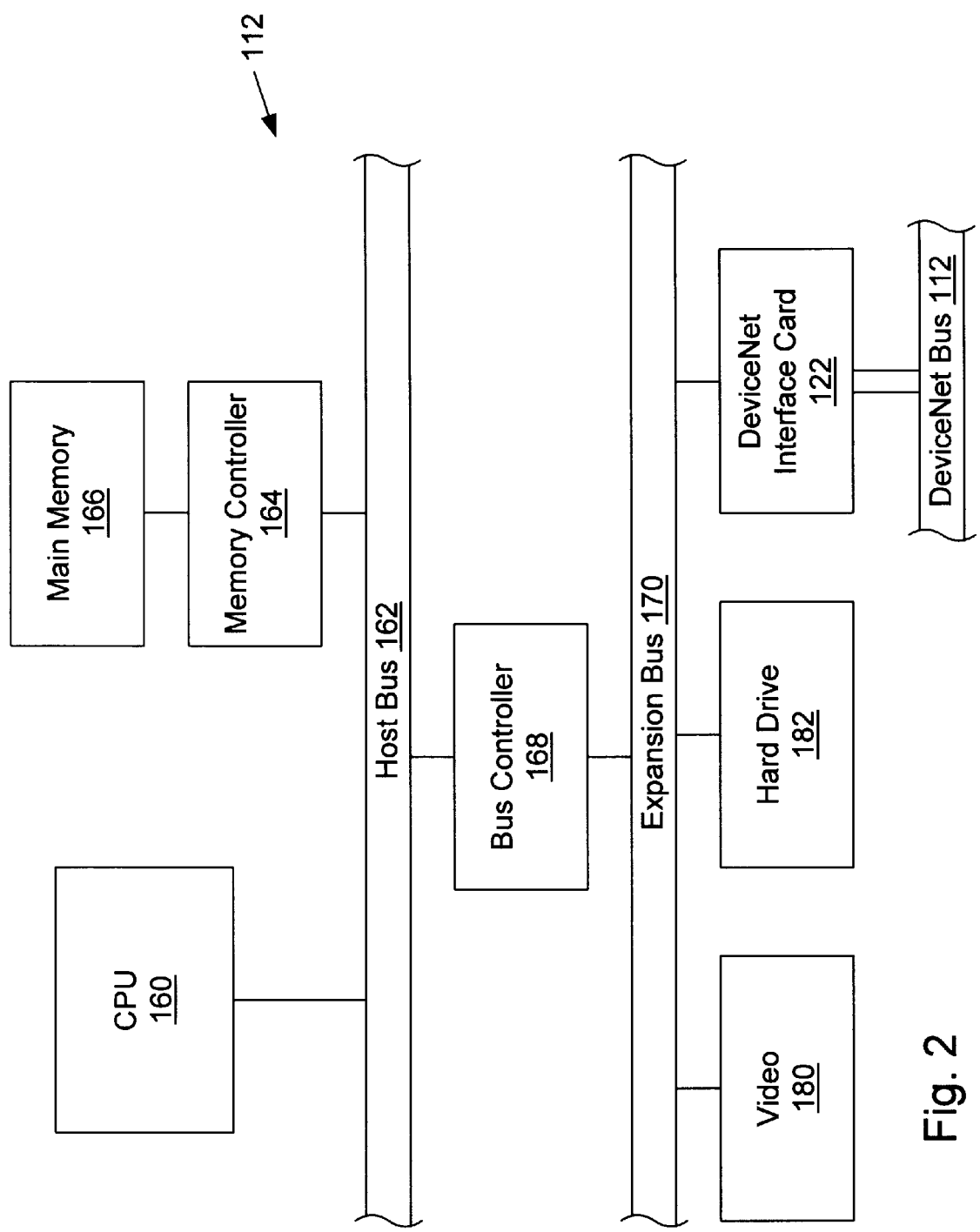
FIG. 2 is a block diagram of the computer system of FIG. 1.

FIG. 2—Computer System Block Diagram

FIG. 2 is a block diagram illustrating an example computer system architecture for a computer system 102 of FIG. 1. It is noted that FIG. 2 illustrates a representative block diagram of the computer system 102 of FIG. 1. It is noted that the computer system 102 may have various different architectures, as desired. The elements of a computer system not necessary to understand the operation of the present invention have been omitted for simplicity.

The computer system 102 includes a central processing unit or CPU 160 which is coupled to a processor or host bus 162. The CPU 160 may be any of various types, including an Intel x86 processor such as the Pentium class from Intel, a PowerPC CPU from the Motorola family of processors, as well as others.

Figure 4:
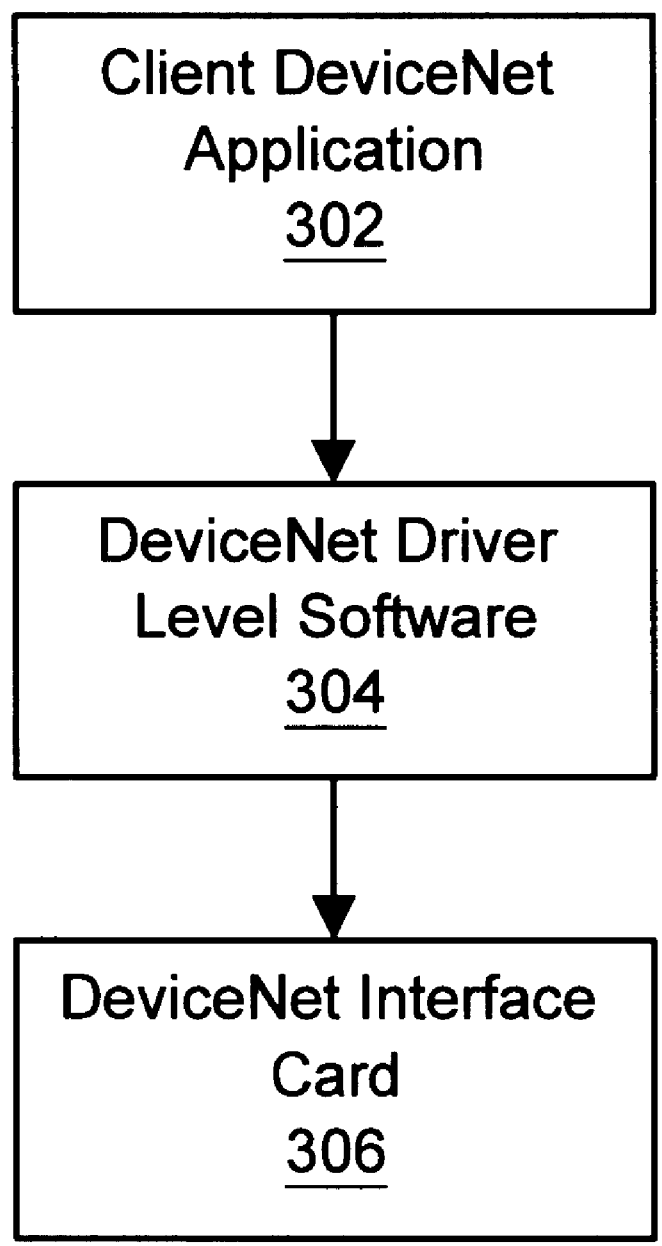
FIG. 4 illustrates the software architecture used in the embodiment of FIG. 1.

Main memory 166, also referred to as system memory 166, is coupled to the host bus 162 by means of memory controller 164. The system memory 166 stores various software used in the industrial control system 100, including a client application and industrial control software. FIG. 4 illustrates a software hierarchy for software comprised in the system. As shown, the system memory 166 stores a client DeviceNet application 302 and DeviceNet driver level software 304. The DeviceNet driver level software is preferably the NI-DNET DeviceNet interface software from National Instruments. As shown in FIG. 4, the client application 302 interfaces through the driver level software 304 to the interface card 306. The system memory 166 may store other software or other industrial communication related software, as desired.

Host bus 162 is coupled to an expansion or input/output bus 170 by means of a bus controller 168. The bus controller 168 preferably comprises standard PC chipset logic. The expansion bus 170 is preferably the PCI (Peripheral Component Interconnect) bus, and the bus controller 168 is preferably chipset logic, available from Intel Corporation. The expansion bus 170 includes slots for various devices, including video 180.

A non-volatile memory or hard drive 182 is comprised in the computer system 102 and may be coupled to the expansion bus 170 or to the chipset 168, or to other logic. The non-volatile memory 182 stores an operating system, image acquisition software, as well as other application programs, for loading into the system memory 166 as known in the art.

A communication board or device 122 according to the present invention is coupled to the expansion bus 170. The communication board 122 is operable to perform communications with an external system or device. The communication device 122 includes a shared memory architecture according to the present invention.

In the preferred embodiment, the present invention is used with a DeviceNet system. Thus, as shown, a DeviceNet interface card 122 is coupled to the expansion bus 170. The DeviceNet interface card 122 in turn couples to DeviceNet bus 112. The DeviceNet bus 112 is preferably comprised in the DeviceNet network 106.

According to the present invention, the interface card 122 includes a processing unit which operates to perform communication functions for communicating with an external system, in this case a DeviceNet or CAN bus. The interface card 122 also includes a shared memory 204 which is used for communication between the host CPU 160 and the processing unit comprised on the communication card or interface card 122. As discussed further below, the interface card further implements a novel high priority/low priority semaphore system and method for enabling high priority and low priority accesses to the shared memory comprised on the interface card 122.

Figure 3:
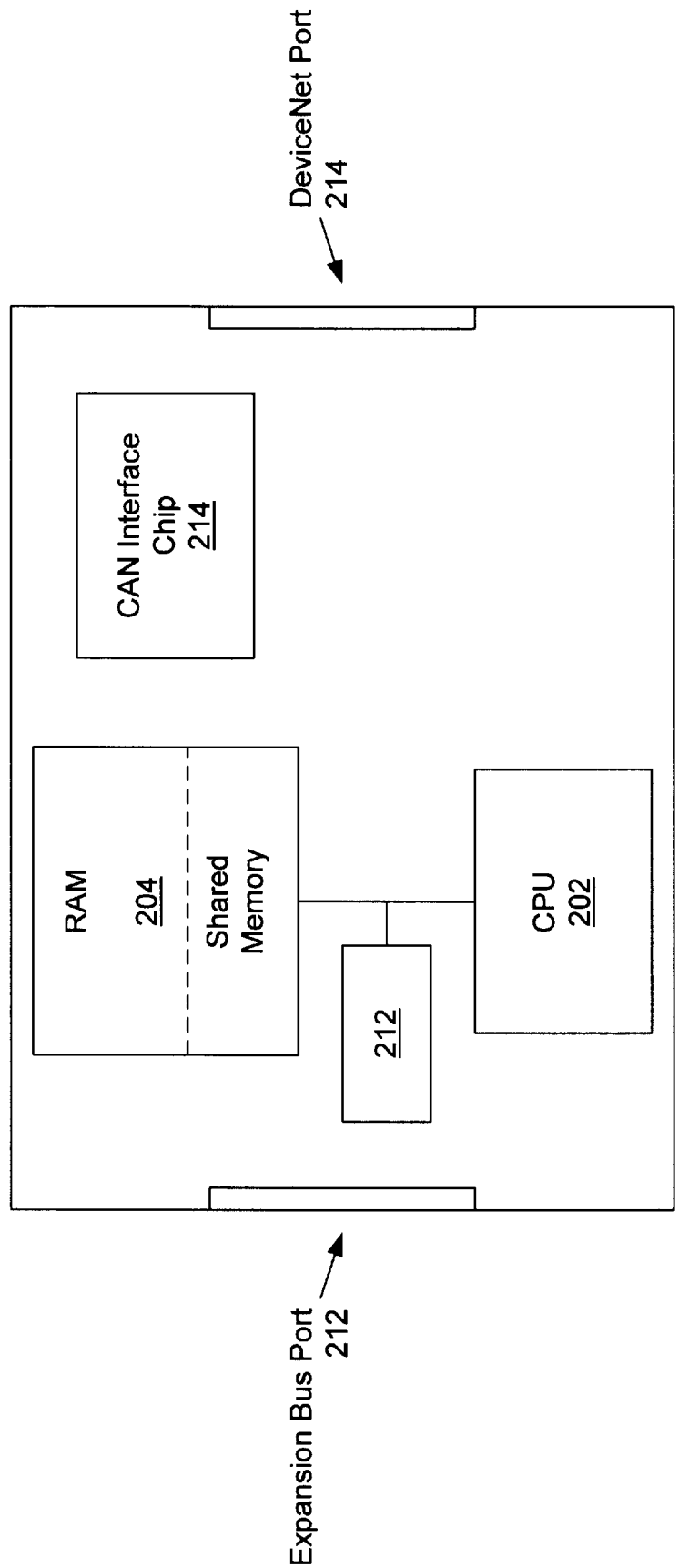
FIG. 3 is a block diagram of the interface card of FIG. 2.

FIG. 3—Interface Communication Device Block Diagram

FIG. 3 is a block diagram illustrating the interface card 122 of FIG. 2. As shown, the interface card 122 includes an expansion bus port 212 for coupling to the expansion bus 170. Where the interface card is a PCI expansion card, the expansion bus port 212 is preferably a PCI expansion bus port. Where the interface card is a PCMCIA card, the expansion bus port 212 is preferably a PC card port or PCMCA card port. The port 212 is operable for coupling to a respective bus comprised in the computer system 102.

The communication device 122 also preferably includes a port for coupling to the communication system and/or device for which the interface card is designed to communicate. In this embodiment, where the interface card 122 is a DeviceNet interface card, the card 122 includes a DeviceNet port 214 for coupling to a DeviceNet network 106.

As shown, the interface card 122 includes a processing unit 202. The processing unit 202 may comprise a CPU, microcontroller, DSP, programmable logic or FPGA, or other type of logic. The CPU 202 couples to a random access memory 204, preferably a dual port RAM. The random access memory 204 preferably includes program instructions, e.g., firmware, which is executable by the CPU 202 and which enables the CPU 202 to perform a communications task. According to the present invention, the random access memory also includes a shared memory portion. The shared memory portion preferably comprises a range of addresses comprised in the RAM which are designated as the shared memory portion. The random access memory 204 preferably also stores one or more semaphores and/or status information which indicate ownership of the shared memory and/or status of read/write requests to the shared memory by the requestors. The interface card or board 122 also includes a local buffer 212 which is used to store data read from the shared memory 204. The interface card 122 also includes a CAN interface chip which performs CAN bus and DeviceNet bus operations.

The shared memory portion of the RAM is useable for communication between the CPU 160 comprised in the host computer 102 and the CPU 202 comprised on the interface card 122. For example, when the interface card 122 acquires data from the DeviceNet network 106, the data is preferably written into the shared memory by the CPU 202, i.e., by the "board" or firmware. The CPU 160 comprised in the host computer 102 then operates to read this data from the shared memory. When it is desirable for the interface card 122 to generate data on to the DeviceNet network 106, the CPU 160 writes data into the shared memory via the port 212, and the board CPU 202 operates to read this data and provide the data through the DeviceNet port 214 on to the DeviceNet network 106.

The communication application executed on the interface card 122 by the CPU 202 is preferably a real time communications application. In other words, it is desirable and/or necessary for the communications device 122 to have a real time and/or deterministic behavior. Thus, in the preferred embodiment, the local CPU 202 comprised on the interface card 122 executes a real time operating system from the memory 204 in order to help guarantee this real time performance.

As discussed above, the shared memory region in the RAM 204 is dual ported and hence accessible by both the host PC, i.e., the host CPU 160, and the local processor 202 comprised on the card 122. Since the shared memory region can be accessed from either of two sides, conflict conditions may occur. If a simple ownership semaphore were used to control shared memory accesses, then the board CPU 202 may be blocked from a shared memory access for a significant period of time, primarily due to the non-deterministic character of the host operating system. As a result, execution of the board firmware may result in significant delays. This is undesirable due to the real time and/or deterministic requirements of the communication application comprised in the firmware which is executed on the card 122.

Therefore, according to the present invention, the interface card 122 utilizes a novel scheme to allow accesses according to different priorities. According to the preferred embodiment, the CPU 202 executing firmware from the RAM 204 is designated as the high priority requester, and the host CPU 160 comprised in the host PC is designated as the low priority requester. The novel access system and method of the present invention operates to guarantee the high priority requester free access to the memory, and the high priority requester or CPU 202 will not be blocked or pre-empted. The host CPU 160 is designated as the low priority requester. Thus, the high priority requester can pre-empt the low priority access if necessary. The present scheme also includes a method for preserving data integrity in case of partial memory accesses, i.e., accesses by a low priority requester which are interrupted by the high priority requester.

The shared memory access method of the present invention generally operates as follows. In general, each time a respective side desires to access the shared memory, the requester is required to gain an accessing semaphore. However, the two sides do not have equal right to gain access to the semaphore and own the semaphore. The high priority side can always gain access to the shared memory for writes, whereas the low priority side may lose the semaphore on a read, even if it currently has ownership of the semaphore. Since the low priority requester's read accesses may be pre-empted if necessary, the scheme includes a method for preserving data integrity in this situation. For host writes and board reads, the shared memory is accessible on a first come first served basis. If the board attempts a read of the shared memory, and the host computer is currently writing to the shared memory, then the board is preferably forced to read previously read data from a local buffer, instead of accessing the shared memory.

Here it is noted that two different situations may arise. In a first case, the low priority side is reading and is interrupted by a high priority write. In the second case, the low priority side is writing data to the shared memory and is interrupted by a high priority read. Since these cases have different data flow directions, two semaphores are used for each of these data flow directions to preserve data integrity when a preemption occurs.

Figure 5:
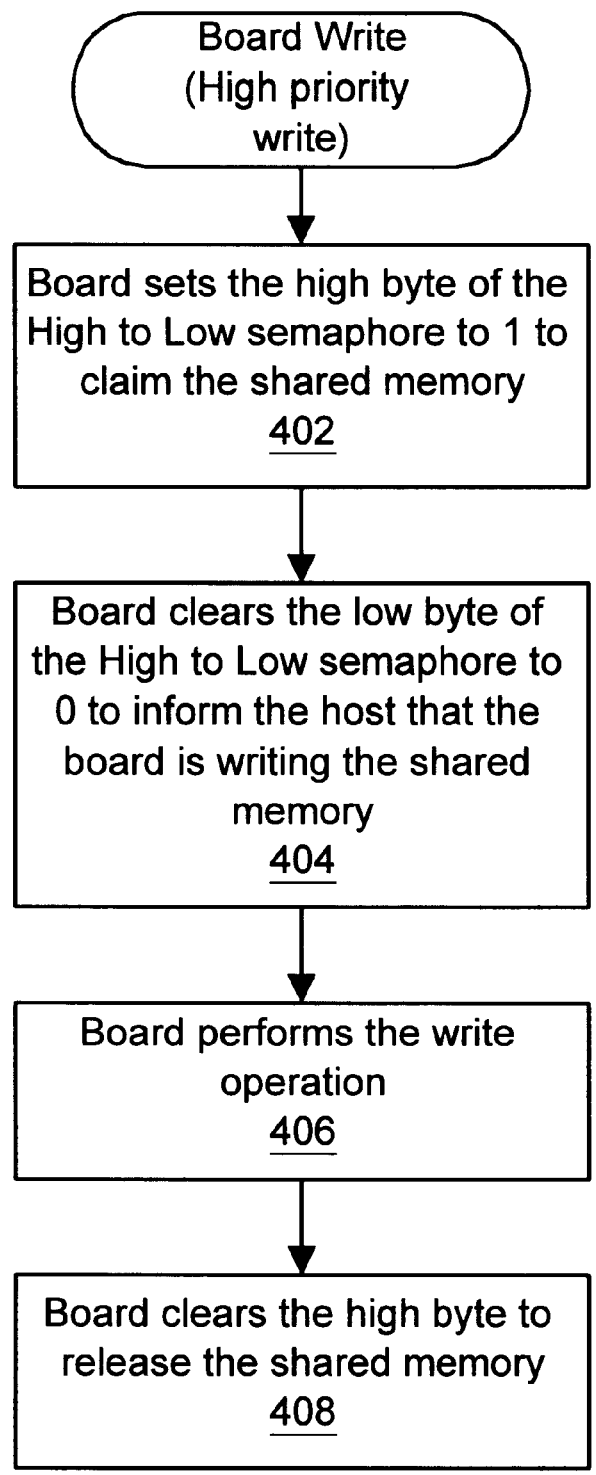
FIG. 5 is a flowchart diagram illustrating a board write (high priority write) to the shared memory according to the present invention.

FIG. 5—Board Write (High Priority Write)

FIG. 5 is a flowchart diagram of a board write operation, i.e., a write operation performed by the local CPU 202 to the shared memory 204. In the following description, the terms "board write" or "board read" refer to operations performed by the local CPU 202 comprised on the interface card 122, which executes firmware or software preferably from the on-board memory 204. The terms "host write" or "host read" refer to operations performed by the host CPU 160 comprised in the computer system 102, or other components comprised in the host computer system 102.

In step 402 the board sets a semaphore to claim the shared memory. In the preferred embodiment, the board sets a byte, preferably the high byte, of a "high to low" semaphore to 1 to claim the shared memory 204. This semaphore is referred to as the "high to low" semaphore, since in the case of a board write, as well as a host read, the data transfer or data flow is occurring from the high priority device to the low priority device, i.e., from the board to the host. Here it is noted that the board is not required to first examine the semaphore to determine if the shared memory 204 is available, but rather since the board is the high priority requester, the board can simply acquire the shared memory 204, even if the host is performing a read at this time.

In step 404 the board clears a byte, preferably the low byte, of the high to low semaphore to 0 to inform the host that the board is writing the shared memory 204. In step 406 the board performs the write operation. In step 408 the board clears the high byte to release the shared memory.

Figure 6A:
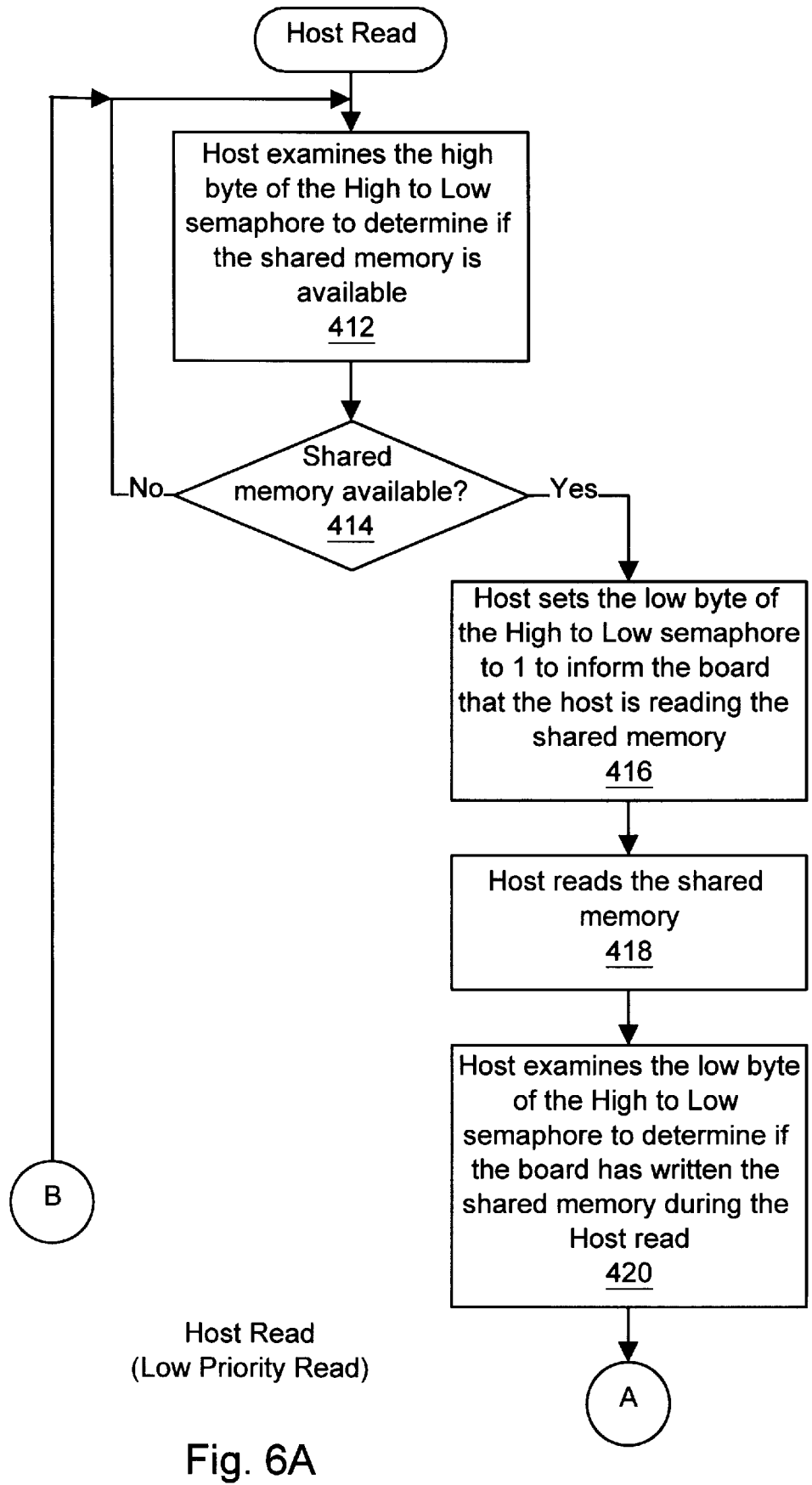
FIG. 6 is a flowchart diagram illustrating a host read (low priority read) to the shared memory according to the present invention.
Figure 6B:
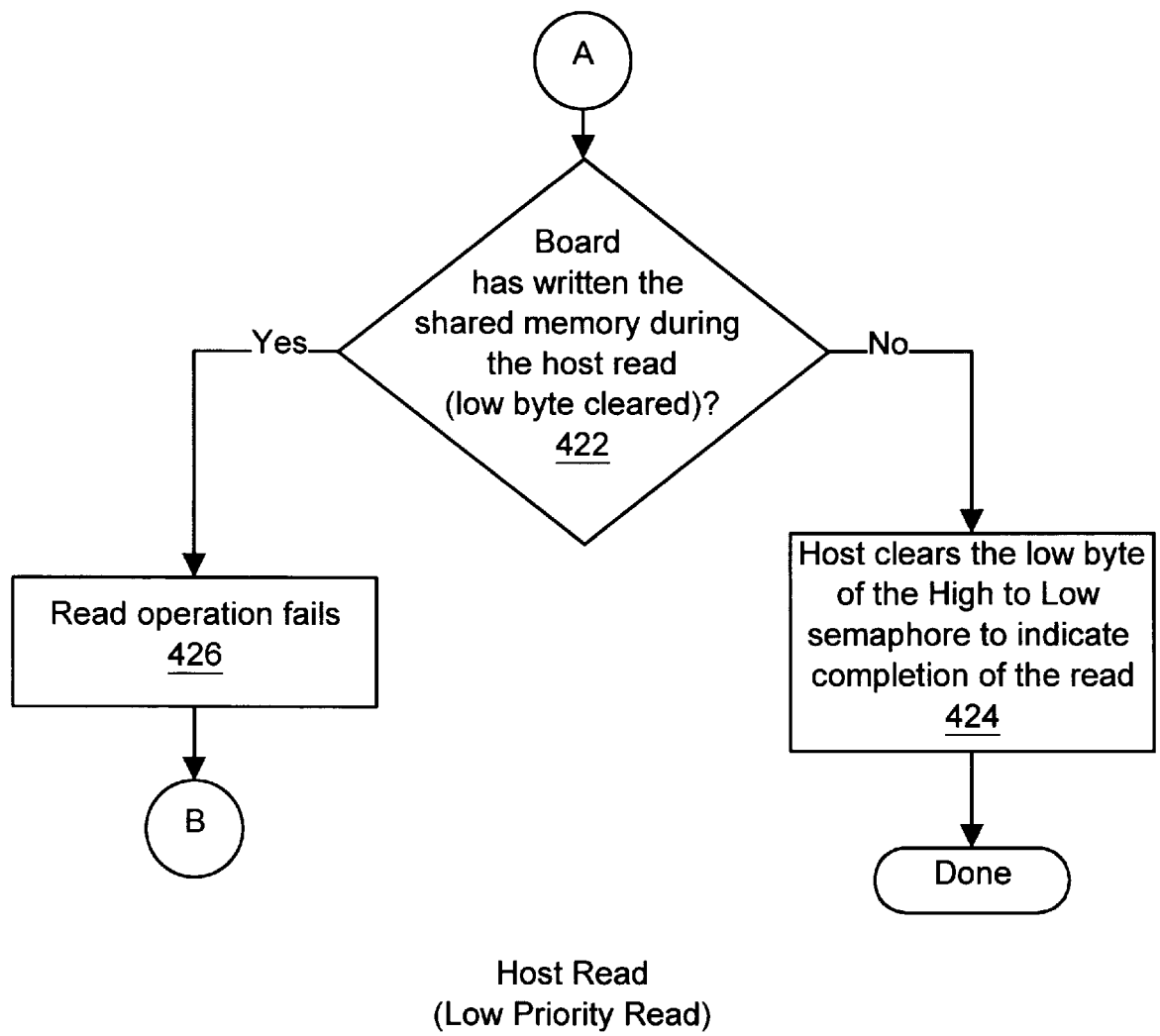

FIGS. 6A and 6B—Host Read

FIGS. 6A and 6B are a flowchart diagram of a host read. In step 412 the host examines the high byte of the high to low semaphore to determine if the shared memory 204 is available. If the shared memory is not available in step 414, then the host preferably waits until the shared memory 204 becomes available, i.e., the host returns to step 412 and preferably periodically or continually examines the high byte until the shared memory is indicated as being available. In an alternate embodiment, if the shared memory is not available in step 414, then the host reads previously read data from a local buffer.

If the shared memory 204 is determined to be available in step 414, then in step 416 the host sets the low byte of the high to low semaphore to 1 to inform the board that the host is reading the shared memory. In step 418 the host reads the shared memory. In step 420 the host examines the low byte of the high to low semaphore to determine if the board has written the shared memory 204 during the host read. This determination is necessary, since the board has a higher priority and thus may have written data into the shared memory 204 while the host was reading data from the shared memory 204. If the board has written data into the shared memory 204 while the host was reading data from the shared memory 204, then the low byte of the high to low semaphore will have been cleared in step 404 during the write.

If the board has not written data into the shared memory 204 while the host was reading data from the shared memory 204, then in step 424 the host clears the low byte of the high to low semaphore to indicate completion of the read. If the board has written data into the shared memory 204 while the host was reading data from the shared memory 204, then in step 426 the read operation fails, and the data read by the host from the shared memory in step 418 is not used.

Figure 7:
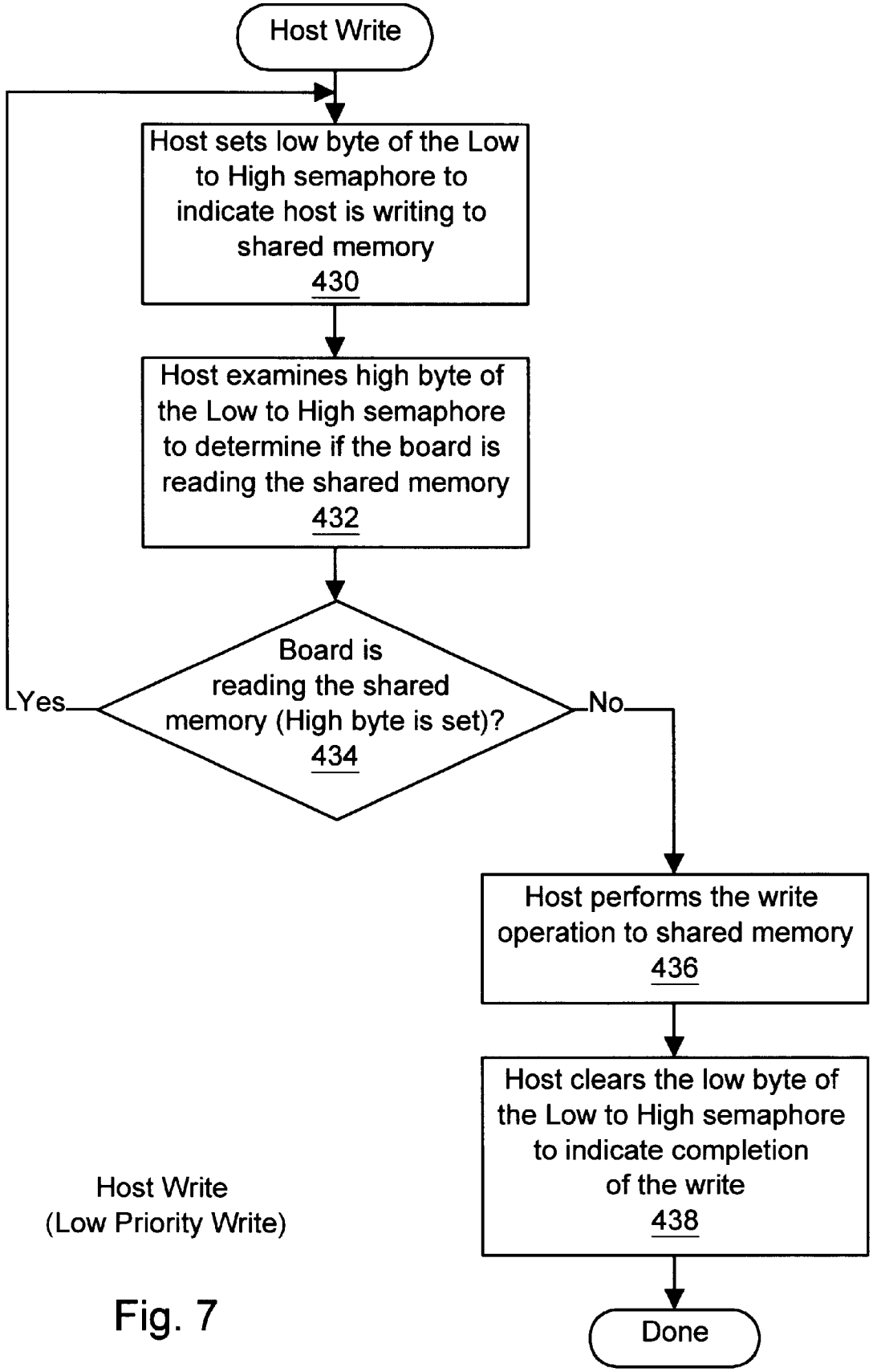
FIG. 7 is a flowchart diagram illustrating a host write (low priority write) to the shared memory according to the present invention.

FIG. 7—Host Write (Low Priority Write)

FIG. 7 is a flowchart diagram illustrating operation of a host write operation. In step 430 the host sets a byte, preferably the low byte, of a "low to high" semaphore to indicate that the host is writing to shared memory. In step 432 the host examines the high byte of the low to high semaphore to determine if the board is reading the shared memory, i.e., to determine if the shared memory is available. This semaphore is referred to as the "low to high" semaphore, since in the case of a host write, as well as a board read, the data transfer or data flow is occurring from the low priority device to the high priority device, i.e., from the host to the board.

If the board is reading the shared memory, i.e., the high byte is set, as determined in step 434, then the host waits until the shared memory 204 becomes available, i.e., the host returns to step 430 (or step 432) and preferably periodically or continually examines the high byte until the shared memory is indicated as being available.

If the board is not reading the shared memory, i.e., the high byte is cleared, as determined in step 434, then in step 436 the host performs the write operation to the shared memory. In step 438 the host clears the low byte of the low to high semaphore to indicate completion of the write.

Figure 8:
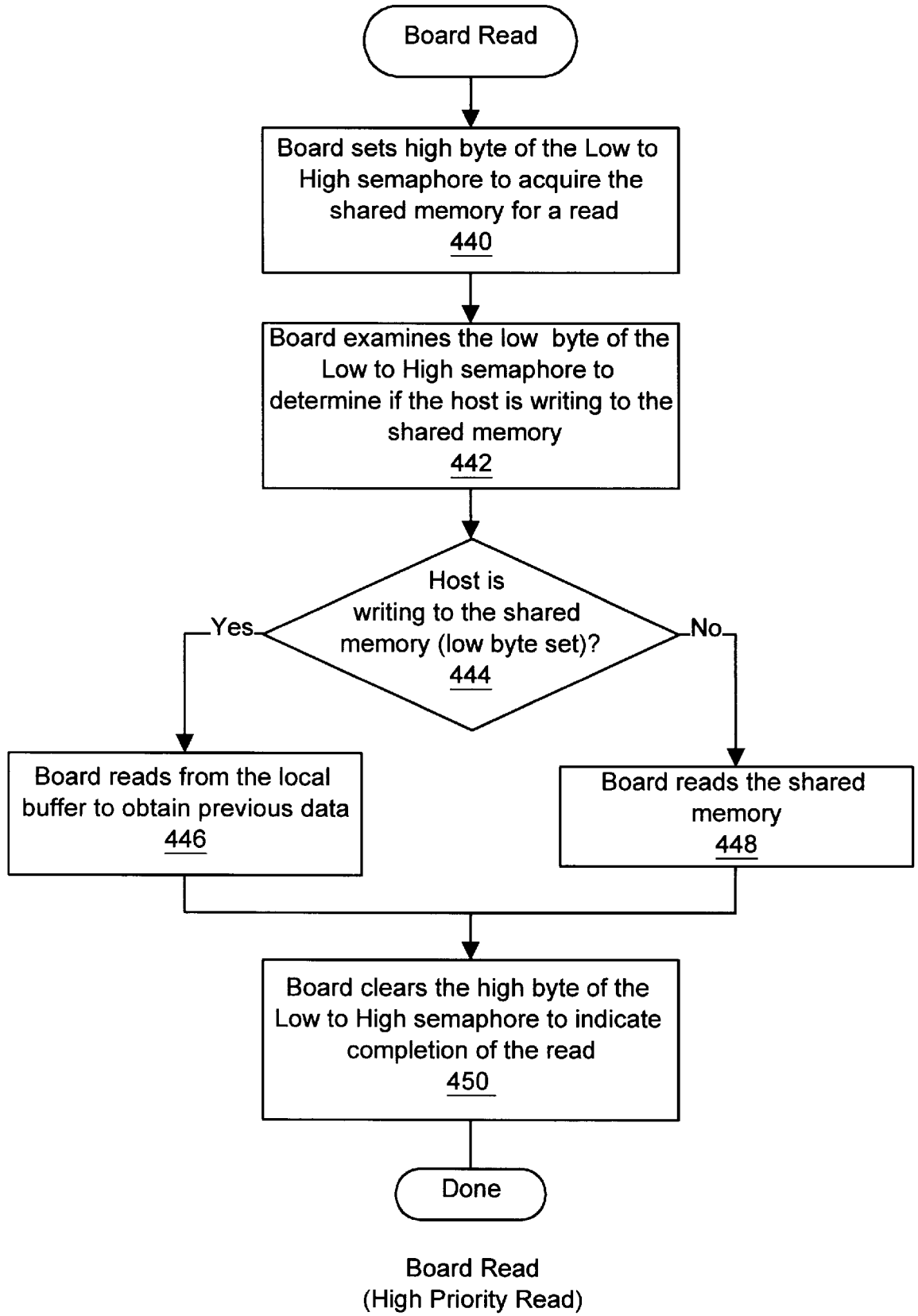
FIG. 8 is a flowchart diagram illustrating a board read (high priority read) to the shared memory according to the present invention.

FIG. 8—Board Read (High Priority Read)

FIG. 8 is a flowchart diagram illustrating a board read operation. In step 440 the board sets the high byte of the low to high semaphore to acquire the shared memory for a read. In step 442 the board examines the low byte of the low to high semaphore to determine if the host is writing to the shared memory 204. If the host is determined to be writing to the shared memory 204 in step 444, i.e., the low byte is set, then in step 446 the board reads from the local buffer to obtain previously read data. Thus if the host is currently writing to the shared memory 204 when a board read is desired, the board reads previously read data from the local buffer instead of reading from the shared memory 204. If the host is not currently writing to the shared memory 204, i.e., the low byte is cleared, the board reads from the shared memory in step 448. In step 448 the board reads from the shared memory and also operates to store the read data in the local buffer 212.

After either of steps 446 or 448, in step 450 the board clears the high byte of the low to high semaphore to indicate completion of the read.

Therefore, as discussed above with reference to the flowcharts of FIGS. 5–8, the board or local processor 202 is the high priority requester, and the host CPU 160 is the low priority requester. Since the low priority side access may be preempted if necessary by the high priority side, data integrity issues must be considered. As discussed above, there are two different situations that may arise. In case 1 the low priority side is reading while the high priority side is writing, i.e., the host is attempting to read the shared memory while the board is writing to the shared memory. In case 2 the low priority side is writing while the high priority side is reading, i.e., the host CPU is writing to the shared memory while the board is reading from the shared memory. Since each of these cases 1 and 2 have different data flow directions, the preferred embodiment utilizes two semaphores, one for each data flow direction. The following summarizes operation of the present invention for the above two cases.

Low Priority Side Reading While High Priority Side Writing

In this case, if the high priority side (board) gains the semaphore first, then read accesses by the low priority side (host computer) are blocked until the write is finished. However, if the low priority side gains the semaphore first, then the high priority side can pre-empt the low priority side. This may cause the low priority side to perform a partial read of data, i.e., to inadvertently read both old and new data during the read, thus possibly causing errors. To avoid this situation, the low priority side is required to verify that it still owns the semaphore after it finishes its access. This is performed in step 420 of FIG. 6A. As discussed above with respect to FIGS. 6A and 6B, the access will be considered as failing if the low priority side does not own the semaphore at the time the read is completed (step 426). If this occurs, the low priority side is required to wait until the semaphore is again available and then re-attempts the read. The read is re-attempted until the low priority side performs the read and completes while still owning the semaphore when the read is completed.

Low Priority Side Writing While High Priority Side Reading

In this case, as discussed with reference to FIGS. 7 and 8, if the high priority side (board) gains the semaphore first, then the low priority side's (host computer's) write operations are blocked until the board read has finished. However, if the low priority side gains the semaphore first, then in the preferred embodiment the high priority side does not simply pre-empt to the low priority side as in the high to low data transfer direction. Rather, in this instance, when the high priority side determines that the low priority side owns the semaphore, the high priority side does not pre-empt the write access by the low priority side. Rather, the high priority side reads previously read data from a local buffer. Thus, in this embodiment, the high priority side preferably always buffers its previous read data. Thus, each time when the high priority side reads from the shared memory 204, the high priority side always updates its local buffer 212. Thus, in the above scenario when the low priority side has already gained access to the semaphore when the high priority side desires to perform a read of the shared memory 204, the high priority side reads data from its local buffer.

The shared memory access scheme of the preferred embodiment, which is discussed above and with reference to FIGS. 5–8, is referred to as the "priority access method." Utilizing the above priority access method shared memory accessing scheme, the high priority side is not required to wait for read or write accessing.

In one embodiment of the invention, in case 1 above where the low priority side is reading while the high priority side is writing, if the high priority side gains the semaphore first, then the low priority side's read access is not blocked. Rather, in this embodiment the low priority side operates to read previously read data from its own local buffer. Thus this operation is similar to case 2 when the high priority side attempts a read when the low priority side has already gained the semaphore. This embodiment is referred to as the "mirror local buffering scheme" or the "double buffering scheme".

In this mirror local buffering scheme embodiment, the two sides are more equal with respect to access rights, and all semaphore waits are avoided. In other words, in this embodiment both high priority and low priority sides are required to read from a local buffer if the other is currently writing to the shared memory. However, one drawback to this method is that extra memory is required to be allocated on the low priority side for the low priority side local buffer. Also, since in this instance the low priority side is reading from its local buffer in some instances, the low priority side may not obtain the most recent data from the shared memory region during this read.

It is noted that both of the above methods, the priority access method and the mirror local buffering scheme, eliminate non-deterministic waits by the firmware or local processor 202, since memory accesses by the processor 202 are deterministic and are required to complete operations within a certain amount of time, while the host side is non-deterministic. In this case where the local processor 202 is deterministic and/or has real time requirements, the priority scheme is deemed more appropriate. However, in embodiments where both sides are non-deterministic, then the mirror local buffering scheme of the alternate embodiment is the preferred method.

FIGS. 9–10

Figure 9:
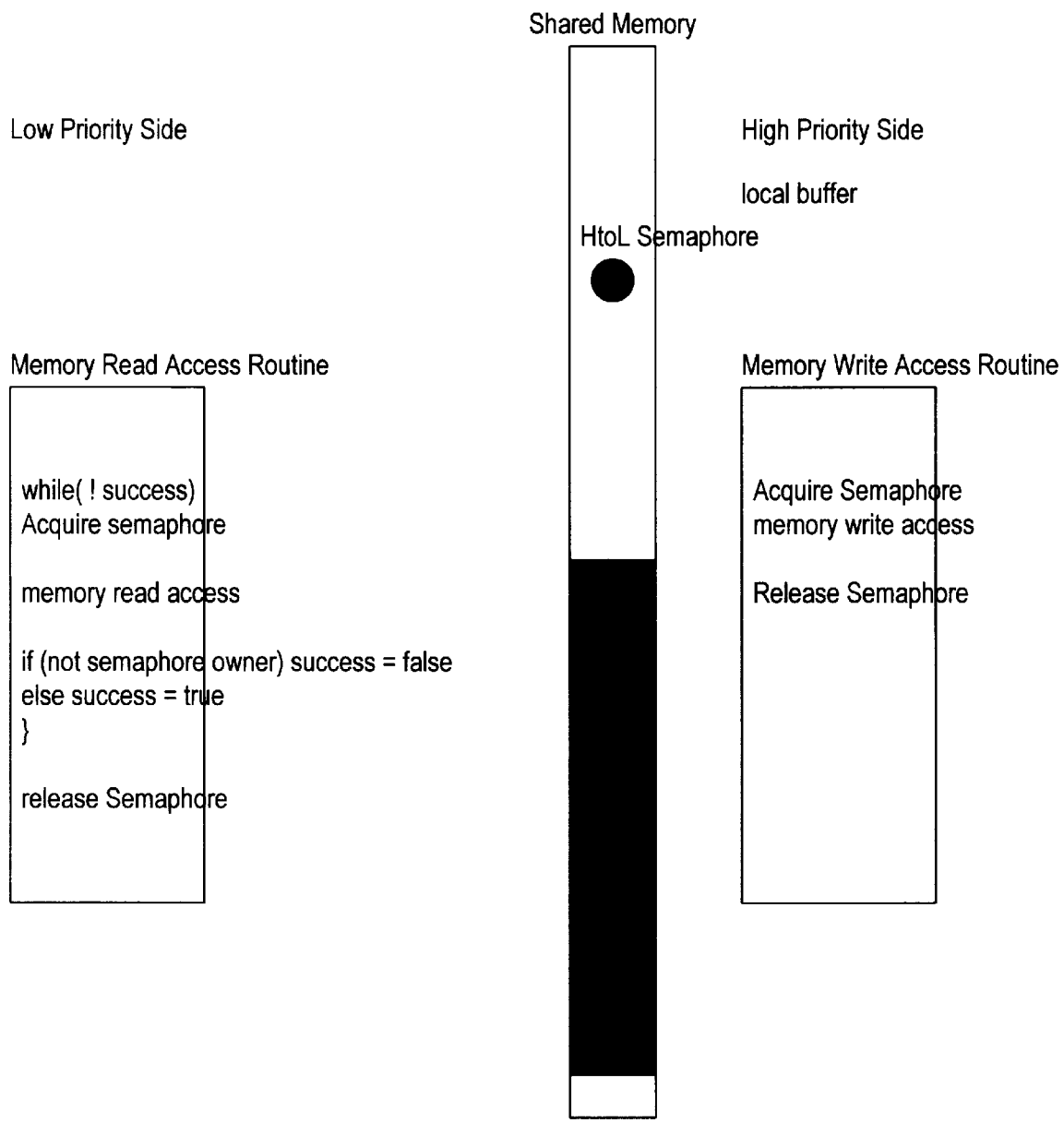
FIG. 9 illustrates operation when the low priority device is reading while the high priority device is writing.

FIG. 9 illustrates operations where the low priority side is reading while the high priority side is writing. FIG. 9 includes pseudo code for the memory read access routine performed by the low priority side, and includes pseudo code for the memory write access routine performed by the high priority side.

As shown for the low priority side, the memory read access routine operates to acquire the semaphore until acquisition of the semaphore is successful. The low priority side then performs the memory read access. After the memory read access has completed, if the low priority side is not still the semaphore owner, meaning that the high priority side has performed a write during this time, then success is stated to be false. In this instance, the low priority side is required to again access the semaphore and re-perform the read operation. If the low priority side is still the owner of the semaphore after the memory read access completes, then success is set equal to true and the semaphore is released. This corresponds to the flowchart of FIGS. 6A and 6B.

As also shown in FIG. 9, the high priority side merely operates to acquire the semaphore, perform the memory write access and then release the semaphore. This corresponds to the flowchart of FIG. 5.

Figure 10:
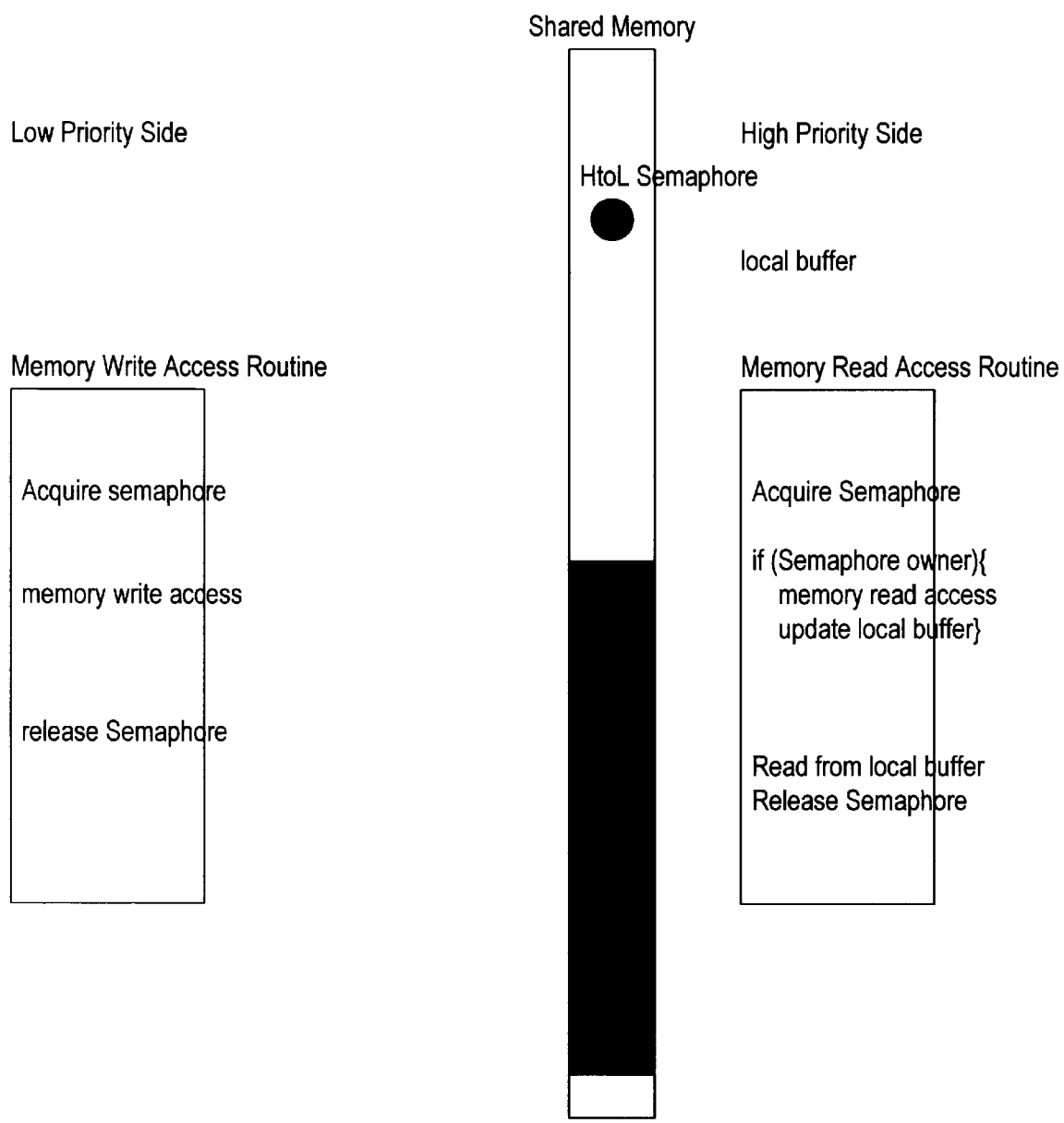
FIG. 10 illustrates operation when the low priority device is writing while the high priority device is reading.

FIG. 10 illustrates operation when the low priority side is writing while the high priority side is reading. As shown, the memory write access routine performed by the low priority side includes acquiring the semaphore, performing the memory write access and then releasing the semaphore. This corresponds to the flowchart of FIG. 7.

As shown in FIG. 10, the memory read access routine performed by the high priority side, which corresponds to the flowchart of FIG. 8, includes the high priority side first acquiring the semaphore. If the high priority side is successful in acquiring and owning the semaphore, then the high priority side performs a memory read access and updates its local buffer. If the high priority side is not successful in acquiring and owning the semaphore, then the high priority side reads from its local buffer. After either reading from the shared memory or the local buffer, the high priority side releases the semaphore.

FIGS. 11–14

FIGS. 11–14 are flowcharts which roughly correspond to the flowcharts of FIGS. 5–8. These flowcharts are similar in content and substance to the flowcharts of FIGS. 5–8, but include different names for the semaphores and include actual variable names used in the source code which implements the present invention.

Figure 11:
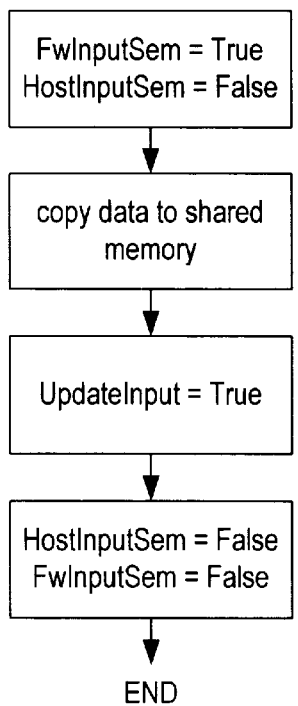
FIGS. 11 and 12 are flowcharts illustrating a board write and host read, respectively, wherein FIGS. 11 and 12 correspond to FIGS. 5 and 6, respectively.
Figure 12:
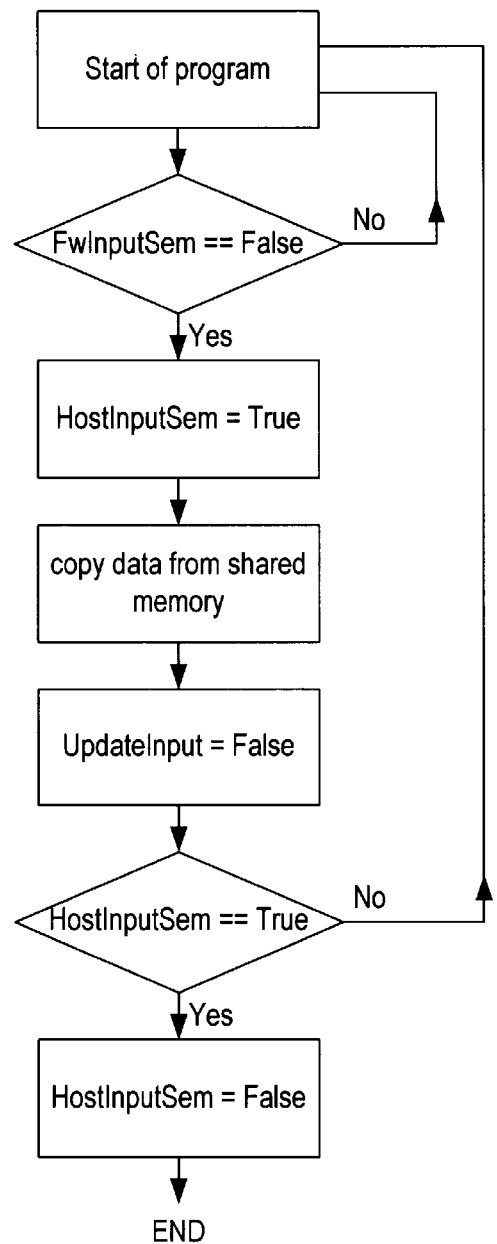

In the flowcharts of FIGS. 11 and 12, the firmware (FW) on the plug-in card is writing data to the shared memory while the host PC reads the data from the shared memory. The semaphores which control the shared memory access are referred to as FwInputSem and HostInputSem. The signal used by the firmware that indicates a new update to the host PC is referred to as UpdateInput.

Figure 14:
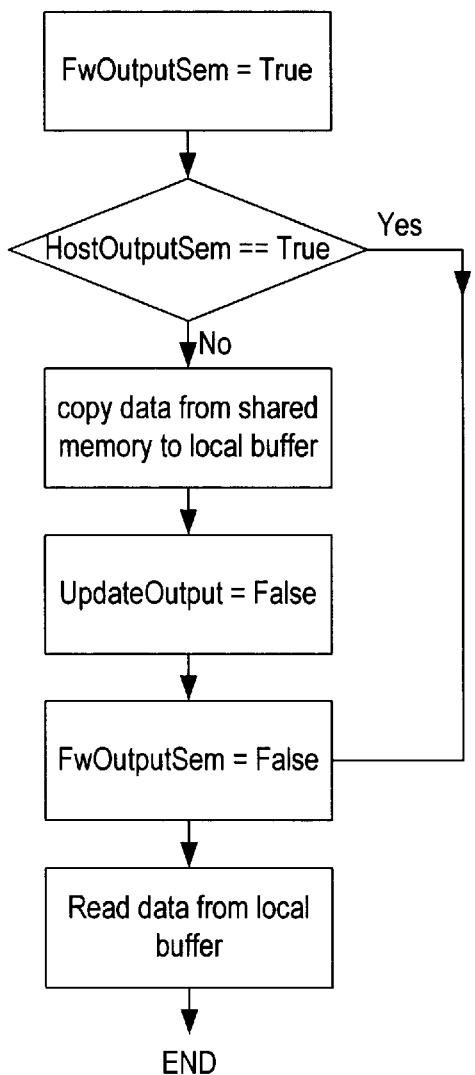
FIGS. 13 and 14 are flowcharts illustrating a board read and host write, respectively, wherein FIGS. 13 and 14 correspond to FIGS. 7 and 8, respectively.
Figure 13:
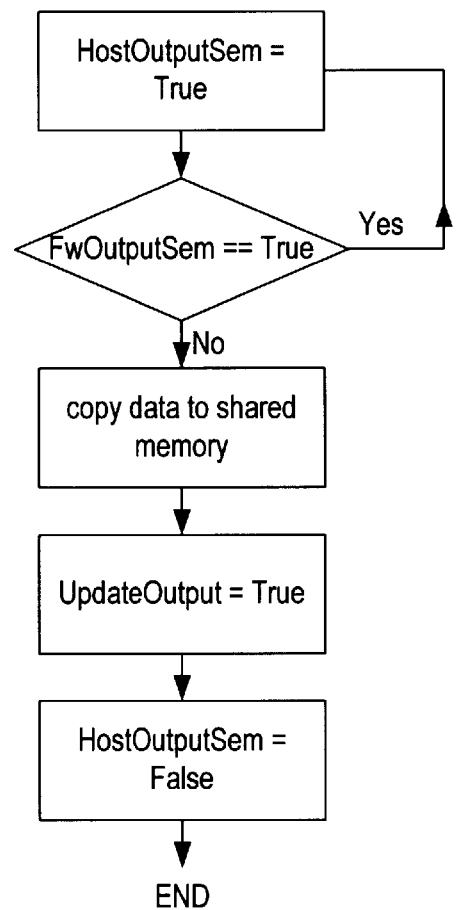

In the flowcharts of FIGS. 13 and 14, the firmware (FW) on the plug-in card reads data from the shared memory while the host PC writes data to the shared memory. The semaphores which control the shared memory access are referred to as FwOutputSem and HostInputSem. The signal used by the host that indicates a new update to firmware is referred to as UpdateOutput.

The following comprises pseudo code which explains semaphore structure algorithm and ownership validation operations.

Semaphore Structure:

```
struct Priority_Semph{
        char    Lsem;
        char    Hsem;
}
Semaphore Algorithm:
LS: low priority side, HS: high priority side;
1: Acquire Semaphore, it will guaranty HS to gain Semaphore when both try to gain
semaphore at same time
    AcquireSemaphoreHS( )
    {
        Hsem=1;
        if( Lsem==0) return true;
        else{ Lsem=0; return false;}
    }
    AcquireSemaphoreLS( )
    {
        Lsem=1;
        if( Hsem==0) return true;
        else {Lsem=0; return false;}
    }
2: Validate Ownership
ValidateOwnerShipLS( )
{
        if( Lsem==1) return true;
        else return false
}
ValidateOwnerShipHS( )
{
        if( Hsem==1) return true;
        else return false
} //no needed in the proposed method
3:Release Semaphore
ReleaseSemaphoreLS( )
{
    Lsem=0:
}
ReleaseSemaphoreHS( )
```

```
{
    Hsem=0;
}
```

Although the system and method of the present invention has been described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

We claim:

1. A method for controlling access to a shared memory in a system, the system comprising a host computer system and a communication device comprised in or coupled to the host computer system, wherein the communication device includes the shared memory and wherein the communication device interfaces to an external system, wherein the communication device includes a local processor which executes a communication application, the method comprising:

the host computer system examining a semaphore to determine if the shared memory is available, wherein said examining the semaphore is performed to initiate a read of the shared memory;

wherein, if the shared memory is determined to be available, the method further comprises:

the host computer system reading the shared memory;

the host computer system determining if the local processor has written the shared memory during the host reading operation;

the host computer system releasing the semaphore indicating completion of the read if the local processor has not written the shared memory during the host reading operation; and the host reading operation failing in response to determining that the local processor has written the shared memory during the host reading operation.

2. The method of claim 1, wherein the host computer system determining if the local processor has written the shared memory during the host reading operation comprises the host computer system examining status information after said reading to determine if the local processor has written the shared memory during the host reading operation.

3. The method of claim 2, further comprising the local processor on the communication device performing a write operation to the shared memory during the host computer system reading the shared memory, wherein the local processor on the communication device performing the write operation to the shared memory comprises:

the local processor manipulating the semaphore to claim the shared memory for the write operation;

the local processor manipulating the status information to inform the host computer that the local processor is writing to the shared memory;

the local processor performing the write operation to the shared memory; and the local processor manipulating the semaphore to release the shared memory after performing the write operation.

4. The method of claim 3, further comprising:

the host computer system manipulating said status information to indicate that the host computer system is reading the shared memory prior to or during the host computer system reading the shared memory;

wherein the host computer system manipulates the status information to a first value to indicate that the host computer system is reading the shared memory;

wherein the local processor manipulates the status information to a second value if the local processor writes the shared memory during the host read operation, wherein the local processor manipulates the status information to a second value to indicate that the local processor has written the shared memory during the host read operation.

5. The method of claim 1, further comprising:

the local processor manipulating a semaphore to acquire the shared memory for a read operation;

the local processor determining if the host computer system is currently writing to the shared memory;

the local processor reading data from a local buffer to obtain previously read data in response to determining that the host computer system is currently writing to the shared memory;

the local processor reading the shared memory in response to determining that the host computer system is not currently writing to the shared memory, wherein the local processor operates to store read data in the local buffer; and the local processor manipulating the semaphore to indicate completion of the read operation after either reading from the local buffer or reading from the shared memory.

6. The method of claim 5, wherein the local processor determining if the host computer system is currently writing to the shared memory comprises the local processor examining status information to determine if the host computer system is currently writing to the shared memory;

the method further comprising:

the host computer system manipulating status information to indicate that the host computer system is writing to the shared memory;

the host computer system examining the semaphore to determine if the local processor is currently reading the shared memory, wherein the host computer system examining the semaphore to determine if the local processor is currently reading the shared memory is performed to initiate a write operation to the shared memory;

wherein, if the local processor is not currently reading the shared memory, the method further comprises:

the host computer system performing the write operation to the shared memory; and the host computer system manipulating the status information to indicate completion of the write after performing the write operation.

7. The method of claim 1, wherein said status information comprises a portion of the semaphore.

8. The method of claim 1, wherein the communication device comprises an industrial automation interface card comprised in the computer system.

9. The method of claim 1, wherein the communication device comprises a DeviceNet interface card comprised in the computer system.

10. The method of claim 1, further comprising:

the host computer system reading data from a local buffer if the shared memory is determined to not be available, wherein the local buffer stores previously read shared memory data.

11. A method for controlling access to a shared memory in a system, the system comprising a host computer system in a communication device comprised in or coupled to the host computer system, wherein the communication device includes the shared memory and wherein the communication device interfaces to an external system, wherein the communication device includes a local processor which executes a communication application, the method comprising:

the local processor manipulating a semaphore to acquire the shared memory for a read operation;

the local processor determining if the host computer system is currently writing to the shared memory;

the local processor reading data from a local buffer to obtain previously read data in response to determining that the host computer system is currently writing to the shared memory;

the local processor reading the shared memory in response to determining that the host computer system is not currently writing to the shared memory, wherein the local processor operates to store read data in the local buffer; and the local processor manipulating the semaphore to indicate completion of the read operation after either reading from the local buffer or reading from the shared memory.

12. The method of claim 11, wherein the local processor determining if the host computer system is currently writing to the shared memory comprises the local processor examining status information to determine if the host computer system is currently writing to the shared memory.

13. The method of claim 11, further comprising the host computer system performing a write operation to the shared memory during the local processor reading the shared memory, wherein the host computer system performing the write operation to the shared memory comprises:

the host computer system manipulating status information to indicate that the host computer system is writing to the shared memory;

the host computer system examining the semaphore to determine if the local processor is currently reading the shared memory, wherein the host computer system examining the semaphore to determine if the local processor is currently reading the shared memory is performed to initiate a write operation to the shared memory;

wherein, if the local processor is not currently reading the shared memory, the method further comprises:
the host computer system performing the write operation to the shared memory; and
the host computer system manipulating the status information to indicate completion of the write after performing the write operation.

14. The method of claim 13, further comprising:

the host computer system examining a semaphore to determine if the shared memory is available, wherein said examining the semaphore is performed to initiate a read of the shared memory;

wherein, if the shared memory is determined to be available, the method further comprises:
the host computer system reading the shared memory;

the host computer system determining if the local processor has written the shared memory during the host reading operation;

the host computer system releasing the semaphore indicating completion of the read if the local processor has not written the shared memory during the host reading operation; and the host reading operation failing in response to determining that the local processor has written the shared memory during the host reading operation.

15. The method of claim 14, wherein the host computer system determining if the local processor has written the shared memory during the host reading operation comprises the host computer system examining status information after said reading to determine if the local processor has written the shared memory during the host reading operation;

the method further comprising:
the local processor on the communication device performing a write operation to the shared memory during the host computer system reading the shared memory, wherein the local processor on the communication device performing the write operation to the shared memory comprises:
the local processor manipulating the semaphore to claim the shared memory for the write operation;
the local processor manipulating the status information to inform the host computer that the local processor is writing to the shared memory;
the local processor performing the write operation to the shared memory; and
the local processor manipulating the semaphore to release the shared memory after performing the write operation.

16. The method of claim 11, wherein the communication device comprises an industrial automation interface card comprised in the computer system.

17. A system for controlling access to a dual port shared memory, the system comprising:

a host computer system;

a communication device comprised in or coupled to the computer system, wherein the communication device includes the shared memory and wherein the communication device interfaces to an external system, wherein the communication device includes a local processor which executes a communication application;

wherein the communication device includes a memory which stores a semaphore, wherein the semaphore indicates ownership of the shared memory;

wherein the host computer system is operable to examine the semaphore to determine if the shared memory is available, wherein said examining the semaphore is performed to initiate a read of the shared memory;

wherein, if the shared memory is determined to be available, the host computer system is operable to read the shared memory;

wherein the host computer system is operable to determine if the local processor has written to the shared memory during the host reading operation;

wherein the host computer system is operable to release the semaphore indicating completion of the read if the local processor has not written the shared memory during the host reading operation; and wherein the host reading operation fails in response to the host computer system determining that the local processor has written the shared memory during the host reading operation.

18. The system of claim 17, wherein the host computer system is operable to examine status information after said reading to determine if the local processor has written the shared memory during the host reading operation wherein the local processor on the communication device is operable to perform a write operation to the shared memory during the host computer system reading the shared memory, wherein the local processor manipulates said status information to inform the host computer that the local processor is writing to the shared memory.

19. A system for controlling access to a dual port shared memory, the system comprising:

a host computer system;

a communication device comprised in or coupled to the computer system, wherein the communication device includes the shared memory and wherein the communication device interfaces to an external system, wherein the communication device includes a local processor which executes a communication application;

wherein the communication device includes a memory which stores a semaphore, wherein the semaphore indicates ownership of the shared memory;

wherein the local processor is operable to manipulate the semaphore to acquire the shared memory for a read operation;

wherein the local processor is operable to determine if the host computer system is currently writing to the shared memory;

wherein the local processor reads data from a local buffer to obtain previously read data in response to determining that the host computer system is currently writing to the shared memory;

wherein the local processor reads the shared memory in response to determining that the host computer system is not currently writing to the shared memory, wherein the local processor operates to store read data in the local buffer; and wherein the local processor is operable to manipulate the semaphore to indicate completion of the read operation after either reading from the local buffer or reading from the shared memory.

20. The system of claim 19, wherein the local processor is operable to examine status information to determine if the host computer system is currently writing to the shared memory;

wherein the host computer system is operable to perform a write operation to the shared memory during the local processor reading the shared memory, wherein the host computer system manipulates the status information to indicate that the host computer system is writing to the shared memory.

\* \* \* \* \*